United States Patent
Kim et al.

(10) Patent No.: US 12,331,385 B2
(45) Date of Patent: Jun. 17, 2025

(54) COMPOSITE MATERIAL

(71) Applicant: KOLON INDUSTRIES, INC., Seoul (KR)

(72) Inventors: Choongnyun Paul Kim, Seoul (KR); Gi Su Ham, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 131 days.

(21) Appl. No.: 17/758,722

(22) PCT Filed: Jan. 14, 2021

(86) PCT No.: PCT/KR2021/000568
§ 371 (c)(1),
(2) Date: Jul. 13, 2022

(87) PCT Pub. No.: WO2021/145708
PCT Pub. Date: Jul. 22, 2021

(65) Prior Publication Data
US 2023/0046282 A1  Feb. 16, 2023

(30) Foreign Application Priority Data

Jan. 16, 2020 (KR) .................. 10-2020-0006227
Jan. 12, 2021 (KR) .................. 10-2021-0004210

(51) Int. Cl.
C22C 45/02    (2006.01)

(52) U.S. Cl.
CPC .......... *C22C 45/02* (2013.01); *C22C 2200/02* (2013.01)

(58) Field of Classification Search
None
See application file for complete search history.

(56) References Cited

U.S. PATENT DOCUMENTS

2009/0025834 A1    1/2009   Poon

FOREIGN PATENT DOCUMENTS

| CN | 1542152 A | * 11/2004 |
| CN | 101508574 B | 11/2012 |
| JP | 2005-057230 A | 3/2005 |
| KR | 10-2007-0029456 A | 3/2007 |
| KR | 20070029456 A | 3/2007 |
| KR | 1020120139821 A | 12/2012 |
| KR | 10-2017-0124441 A | 11/2017 |

OTHER PUBLICATIONS

English language machine translation of CN-1542152-A. Generated May 30, 2024. (Year: 2024).*

* cited by examiner

*Primary Examiner* — Brian D Walck
(74) *Attorney, Agent, or Firm* — Harvest IP Law, LLP

(57) ABSTRACT

According to an aspect of the present disclosure, a composite material includes: a primary phase which is an alloy including a metallic element M and a nonmetallic element X and of which at least a portion is an amorphous phase; and a secondary phase which is dispersed in the primary phase and includes a ceramic compound including the metallic element M and the nonmetallic element X and represented by $M_a X_b$ (wherein a and b are each greater than 0).

7 Claims, 6 Drawing Sheets

[Figure 1]
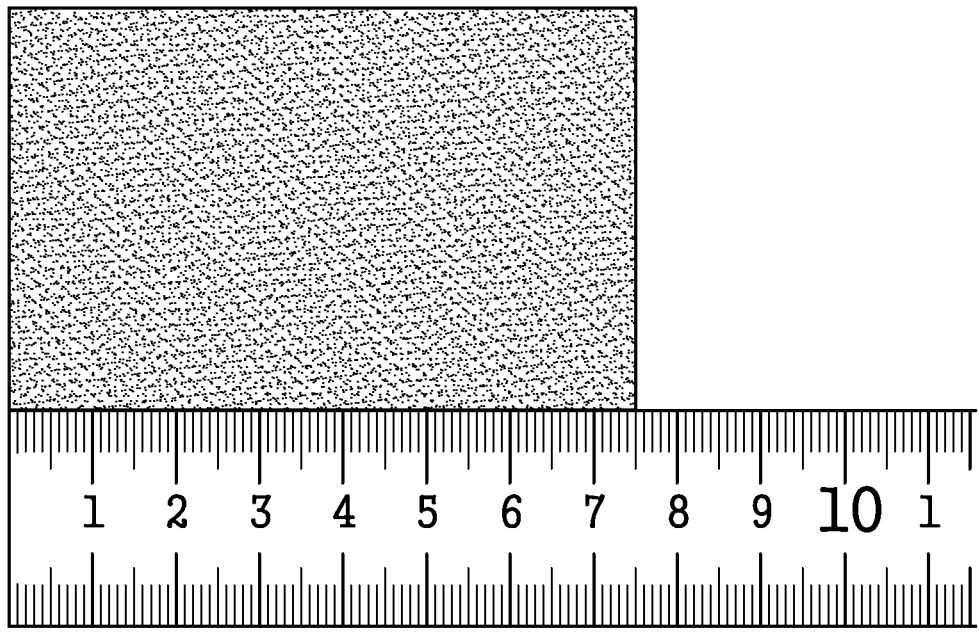

【Figure 2】
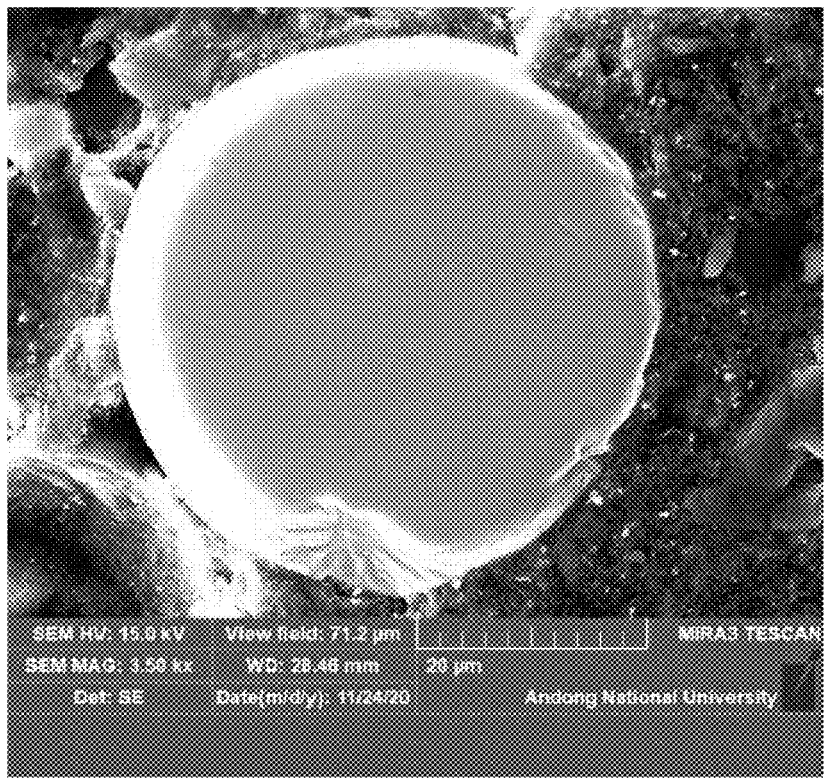
【Figure 3】
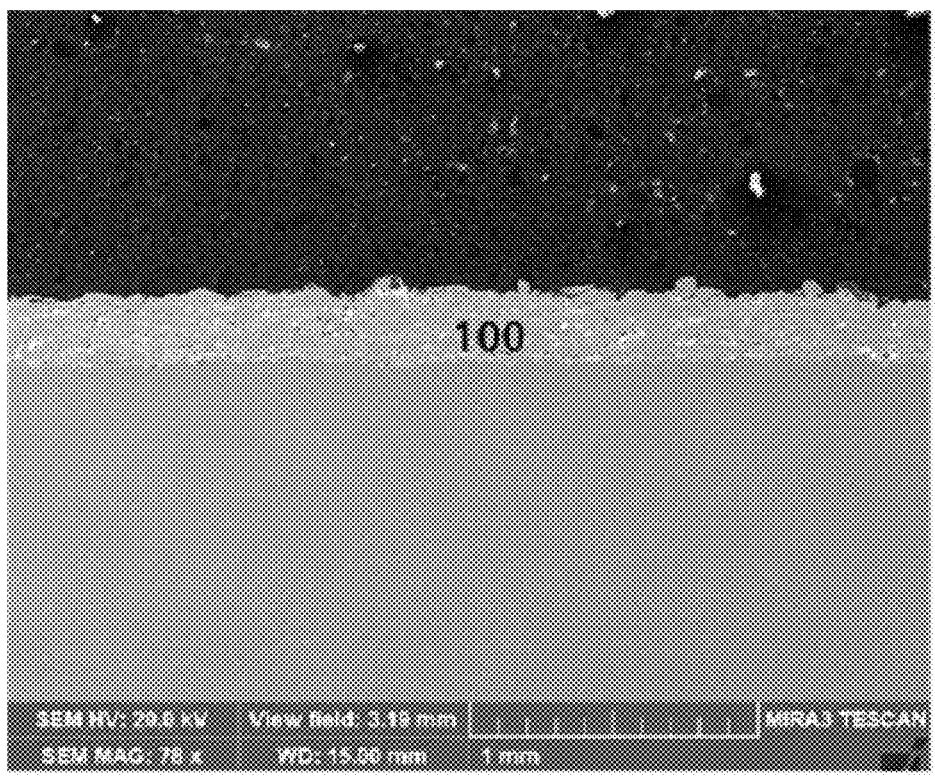

[Figure 4]
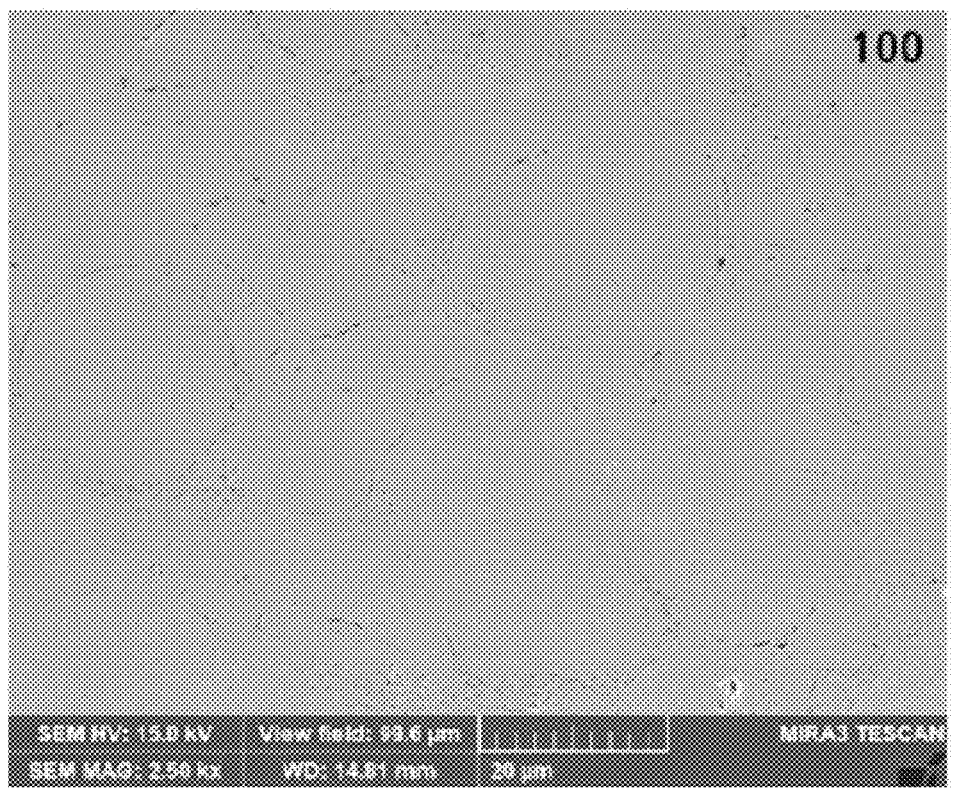

[Figure 5]
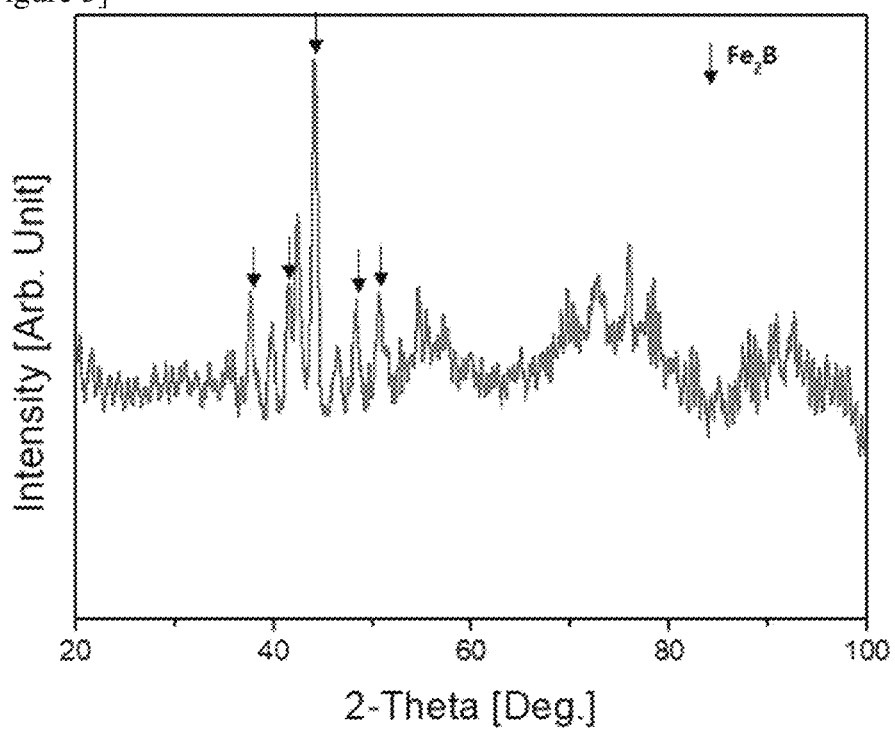
[Figure 6]
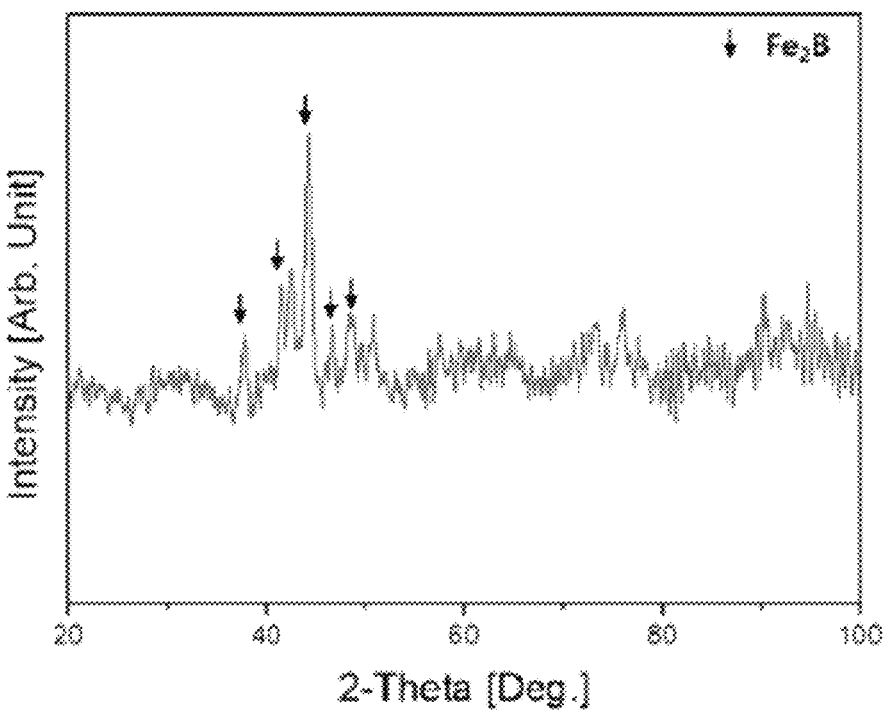

[Figure 7]
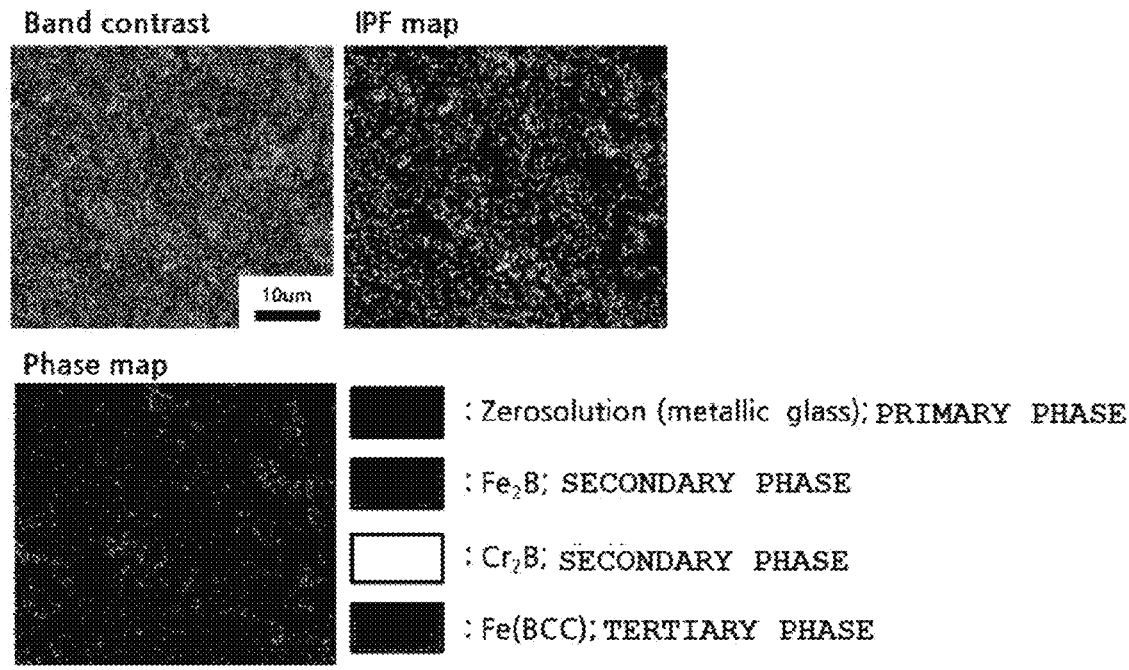
EXAMPLE 5
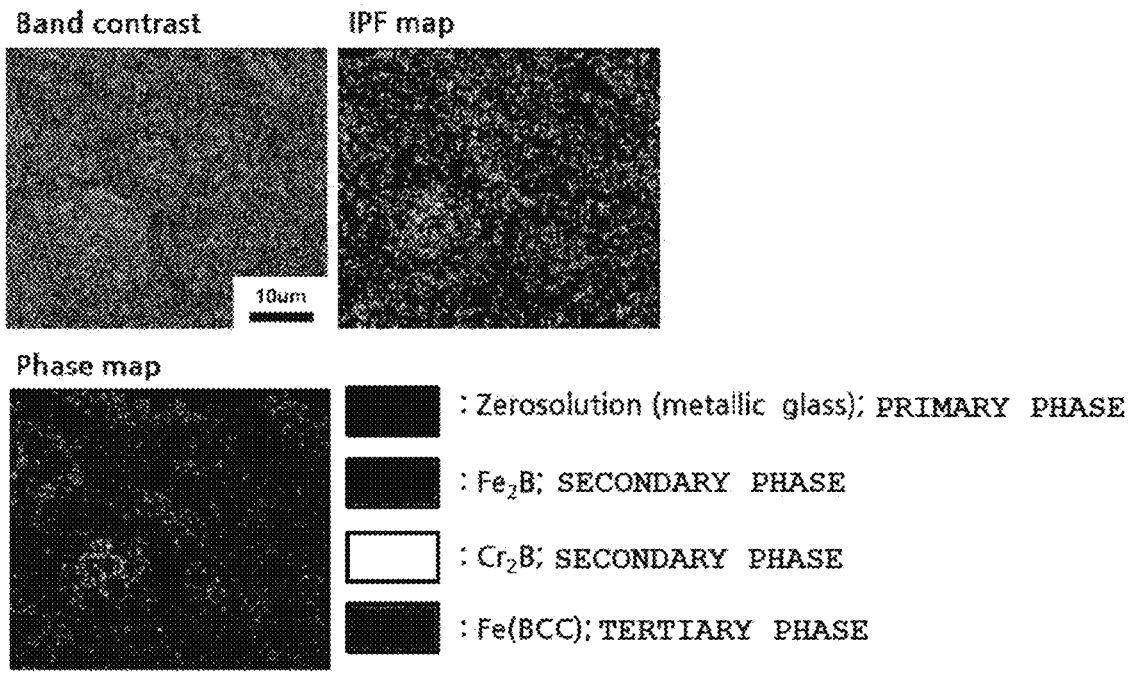
[Figure 8]
EXAMPLE 12

[Figure 9]
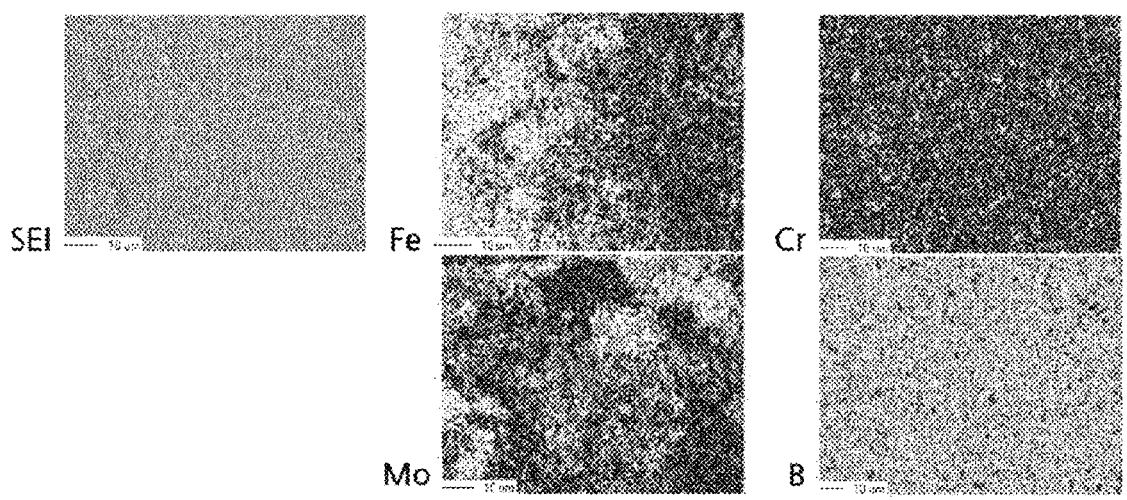

COMPOSITE MATERIAL

CROSS REFERENCE TO RELATED APPLICATIONS

This application is a National Stage of International Application No. PCT/KR2021/000568 filed Jan. 14, 2021, claiming priority based on Korean Patent Application No. 10-2020-0006227 filed on Jan. 16, 2020 and Korean Patent Application No. 10-2021-0004210 filed on Jan. 12, 2021.

TECHNICAL FIELD

An aspect of the present disclosure relates to a composite material, and more particularly, to a composite material including an amorphous alloy and a crystalline ceramic compound.

BACKGROUND ART

A composite material is made using different types of materials and may thus have new characteristics which may not be obtained with a single material. Thus, composite materials made using various raw materials are used in various fields.

In general, such a composite material has two or more phases such as a matrix phase continuously surrounding other phases, and a phase dispersed in the matrix phase. According to methods of combining different materials with each other, composite materials may be classified into laminated composite materials formed by stacking two materials; particle composite materials containing powder particles; and fiber reinforced composite materials having a structure in which steel wires or fibers are embedded in a base material in a specific direction.

Materials such as metals, organic compounds, nanomaterials, and ceramic materials may be used as raw materials for composite materials, and thereamong, ceramic materials have many uses. Ceramic materials have structures guaranteeing high strength, high toughness, high hardness, high-temperature resistance, high wear resistance, high corrosion resistance, and high chemical stability, and are thus being used in various technical fields such as the aerospace, shipping, automobile, alternative energy, electronic information, metallurgy, and chemical industries.

Recently, research has been conducted into alloys, particularly, into aluminum alloys that can be used as lightweight materials having greater strength than that of steels and wear resistance and corrosion resistance comparable to those of ceramic materials while maintaining lightness, and research has been actively conducted into modifying crystalline materials through improvements in solidifying methods and heat treatment methods so as to obtain amorphous alloys having atomic arrangements different from those of crystalline materials.

In this case, amorphous alloys may be used to produce ultrahigh-strength materials which have a 3 GPa strength grade, a high specific strength for weight reductions of components, and uniform microstructures for improvements in corrosion resistance and wear resistance. Thus, amorphous alloys are expected to have a significant ripple effect on related industries such as the automobile, semiconductor, aerospace, nuclear power, space, military, and nanodevice industries.

In addition to research into adjustment of the alloying composition ratio of amorphous alloys, research has also been conducted into composite materials in which secondary phases having various forms and various volume fractions are dispersed. According to the characteristics of secondary phases in composite materials having an amorphous matrix, the strength and ductility of the composite materials may be improved, the toughness of the composite materials may be increased, and the composite materials may have work hardenability. The reason for this is that the development of shear bands is suppressed according to the types, shapes, and sizes of dispersed secondary phases.

However, additional process control is necessary to perform a rapid cooling process for forming amorphous phases in such amorphous alloy composite materials, and during a process of forming a composite material by mixing an alloy with alloying elements forming a secondary phase, problems may occur such as non-uniform dispersion of the secondary phase and unintended reactions, making it difficult to manufacture composite materials having good physical properties. Thus, research is needed to address these problems.

DISCLOSURE

Technical Problem

An object of the present disclosure is to provide a composite material in which a high-hardness ceramic phase is included in an amorphous matrix having good physical and chemical properties without a decrease in overall properties that may be caused by problems between different materials, that is, an amorphous alloy and a ceramic material (such as low coupling strength, unexpected chemical reaction, high porosity between different materials), such that the composite material may have good physical and chemical properties as a whole.

Another object of the present disclosure is to provide a composite material having two or more different phases, in which a secondary phase is uniformly dispersed in a primary phase which is a matrix such that the composite material may have uniform and good properties.

In addition, another object of the present disclosure is to provide a composite material in which a crystalline phase is dispersed in an amorphous matrix while minimizing the formation of impurities caused by a chemical reaction occurring along interfaces between the crystalline phase and the amorphous matrix, such that the composite material may have good mechanical properties, and cracks may not easily propagate in the composite material.

Technical Solution

An aspect of the present disclosure provides a composite material including:
a primary phase which is an alloy including a metallic element M and a nonmetallic element X and of which at least a portion is an amorphous phase; and a secondary phase which is dispersed in the primary phase and includes a ceramic compound, the ceramic compound including the metallic element M and the nonmetallic element X and represented by $M_aX_b$ where a and b are each greater than 0.

The metallic element M may include at least one selected from the group consisting of Fe, Cr, Mo, Ni, Co, Cu, Ti, V, Nb, Ta, W, Mn and Al, and the nonmetallic element X may include at least one selected from the group consisting of Si, B, C, N, S and P.

The ceramic compound may precipitate from the primary phase as the metallic element M and the nonmetallic element X are combined with each other.

The ceramic compound included in the secondary phase may be crystalline.

The secondary phase in the composite material may have a distribution density of 0.2 phase/μm to 1.2 phase/μm. The composite material may further include a tertiary phase which is dispersed in the primary phase and includes a crystal phase of the metallic element M. $M_aX_b$ may include an Fe-based boride or Cr-based boride.

The primary phase and the secondary phase may be provided from a master alloy composition including the metallic element M and the nonmetallic element X, and the nonmetallic element X may be included in a larger amount in the master alloy composition than in the primary phase. The composite material may be powder.

According to other aspects of the present disclosure, a composite material-coated body includes an alloy coating layer provided by coating a base material with the composite material, and a composite material-formed body is fabricated by forming the composite material.

Advantageous Effects

According to an aspect of the present disclosure, the composite material includes; an amorphous alloy as a matrix having a primary phase; and a crystalline ceramic compound dispersed in the primary phase. Since the amorphous alloy and the crystalline ceramic compound are combined with each other, wear resistance and friction characteristics may be further improved, and brittleness may be compensated for. In addition, the chemical characteristics of the composite material may also be improved by controlling the type of ceramic compound.

In addition, since the ceramic compound of a secondary phase precipitates from the primary phase while a master alloy composition having a single composition ratio is cooled, the ceramic compound may be uniformly and finely dispersed throughout the composite material without interfacial reaction between different substances, and thus other substances such as impurities may not be produced while the composite material is formed. Therefore, the composite material may have good characteristics along interfaces between the first and secondary phases, and may thus have good brittleness characteristics and good physical characteristics.

In addition, the amount and composition of the secondary phase, which is dispersed in the composite material, may be adjusted by controlling the contents of metallic and nonmetallic elements in an alloy composition.

DESCRIPTION OF DRAWINGS

FIG. 1 is a photograph of a composite material-coated body of an embodiment of the present disclosure.

FIG. 2 is an electron micrograph of a cross-section of a composite material powder of Example 5.

FIGS. 3 and 4 are electron micrographs of a composite material-coated body of Example 12.

FIG. 5 is a graph showing results of an XRD analysis of the composite material powder of Example 5.

FIG. 6 is a graph showing results of an XRD analysis of the composite material-coated body of Example 12.

FIG. 7 is a view showing results of an EBSD analysis of the composite material powder of Example 5.

FIG. 8 is a view showing results of an EBSD analysis of the composite material-coated body of Example 12.

FIG. 9 is a view showing results of an EPMA analysis of the composite material-coated body of Example 12.

BEST MODE

In the following detailed description of the present disclosure, it should be understood that terms used herein are for the purpose of describing specific embodiments and are not intended to limit the scope of the present disclosure defined only by the appended claims. All technical and scientific terms used herein have the same meanings as commonly understood by those of ordinary skill in the art, unless otherwise stated.

Throughout this specification and claims, unless stated otherwise, terms such as "comprise," "comprises," and "comprising" specify the presence of a stated object, a state step, a group of stated objects, or a group of stated steps, but do not preclude the presence or addition of another object, another step, a group of other objects, or a group of other steps.

In addition, various embodiments of the present disclosure may be combined with any other embodiments unless clearly indicated to the contrary. In particular, any feature indicated as preferred or advantageous may be combined with any other feature and features indicated as preferred or advantageous.

In the drawings, the width, length, thickness, etc. of any element may be exaggerated for ease of illustrated. The drawings are described from an observer's point of view as a whole, and when it is described that an element is "above/below" or "on/under" another element, the element may be "directly above/directly below" the other element, or intervening elements may also be present.

In the present specification, the term "amorphous" or "amorphousness," which is generally also called non-crystalline or amorphous phase, is used to refer to a phase of a solid in which crystals are not formed, that is, a phase that does not have a regular structure.

According to an aspect of the present disclosure, a composite material 100 may include: a matrix including an amorphous alloy as a primary phase; and a crystalline ceramic compound as a secondary phase dispersed in the matrix.

The primary phase may also be referred to as a continuous phase of the composite material 100, and forms a matrix or a main phase in the composite material 100.

Here, the primary phase may be an alloy including an amorphous phase. In this case, the alloy may include a metallic element M and a nonmetallic element X, and preferably, the alloy may be at least partially amorphous.

Although the composition of the alloy of the primary phase is not limited, the alloy may have a strong amorphous forming ability and may thus have a high amorphous phase fraction.

According to an embodiment of the present disclosure, the alloy may be an iron (Fe)-based alloy, but the alloy is not limited to an iron-containing or iron-based alloy. The alloy may be any alloy which has a composition for having an amorphous forming ability and an amorphous phase.

According to an embodiment, the metallic element M of the alloy may include at least one metallic element selected from the group consisting of Fe, Cr, Mo, Ni, Co, Cu, Ti, V, Nb, Ta, W, Mn, and Al, and the nonmetallic element X of the alloy may include at least one nonmetallic element selected from the group consisting of Si, B, C, N, S, and P.

The alloy, which is amorphous and has the primary phase, may include an amorphous phase in an amount of 50 vol % or more and preferably in an amount of 50 vol % to 80 vol % based on the entire region of the primary phase. When the amorphous phase faction is less than the range mentioned above, the secondary phase may include an unexpected ceramic compound, thereby increasing the brittleness of the composite material 100 and deteriorating the mechanical characteristics of the composite material 100. When the amorphous phase fraction is greater than the range mentioned above, formation of the ceramic compound reduces, deteriorating the wear resistance of the composite material 100 or facilitating the development of cracks in the composite material 100.

The secondary phase is a phase dispersed in an alloy matrix, that is, in the primary phase, and includes the ceramic compound.

Here, the ceramic compound refers to a compound that may be expressed by a chemical formula such as $M_aX_b$, where M refers to a metallic element including at least one selected from the group consisting of Fe, Cr, Mo, Ni, Co, Cu, Ti, V, Nb, Ta, W, Mn and Al, and X refers to a nonmetallic element combined with the metallic element M and including at least one selected from the group consisting of Si, B, C, N, S, and P.

In this case, the metallic element M and the nonmetallic element X included in the ceramic compound are elements included in the alloy forming the primary phase.

Furthermore, in the ceramic compound, coupling coefficients a and b are numbers each exceeding 0 and encompassing an integer and a decimal. The coupling coefficients a and b indicate a coupling ratio of a selected metallic element and a selected nonmetallic element for forming a stable compound, and there may be one or more combinations of a and b.

For example, when M is Fe and X is B, possible compounds include Fe-based borides such as $Fe_2B$, FeB, and $FeB_2$, and $Fe_2B$ may predominantly precipitate depending on the content of B in the composition of the alloy.

In another example, when M is Cr and X is B, possible compounds include Cr-based borides such as $Cr_2B$, CrB, and $Cr_3B_2$, and $Cr_2B$ may predominantly precipitate.

In another example, when M is Mo and X is B, possible compounds include MoB, $MoB_2$, $Mo_2B$, $MoB_4$, and the like, and MoB may predominantly precipitate.

In another example, when M is Ni and X is B, possible compounds include NiB, $Ni_2B$, $Ni_3B$, $Ni_4B$, $NiB_3$, and the like, and $Ni_3B$ may predominantly precipitate.

In another example, when M is Co and X is B, possible compounds include CoB, $Co_2B$, $Co_3B$, and the like, and $Co_3B$ may predominantly precipitate.

In another example, when M is Ti and X includes B or C, possible compounds include TiB, $TiB_2$, $Ti_3B_4$, TiC, and the like, and TiB and TiC may predominantly precipitate.

In another example, when M is V and X is C, possible compounds include VC, $V_2C$, $V_4C_3$, and the like, and $V_2C$ may predominantly precipitate.

In another example, when M is Nb and X includes B or C, possible compounds include NbB, $NbB_2$, $Nb_3B_4$, $Nb_5B_6$, $Nb_3B_2$, NbC, $Nb_2C$, and the like, and $Nb_2B$ and $Nb_2C$ may predominantly precipitate.

In another example, when M is Ta and X includes B or C, possible compounds include TaB, $TaB_2$, $Ta_2B$, $Ta_3B_2$, TaC, $Ta_2C$, and the like, and $TaB_2$ and $Ta_2C$ may predominantly precipitate.

In another example, when M is W and X includes B or C, possible compounds include WB, $W_2B$, $W_2B_5$, WC, $W_2C$, and the like, and $W_2B$ and WC may predominantly precipitate.

The secondary phase is uniformly distributed in the primary phase and includes the crystalline ceramic compound. The crystalline ceramic compound forms crystal grains or grains, and since the metallic element M and the nonmetallic element X combine with each other and precipitate as the crystalline ceramic compound from the primary phase, other impurities, other compounds, or other substances, which may be generated by chemical reactions, are not present in the grains and along the grain boundaries of the primary phase or may exist in very small amounts that cannot be observed or detected.

The secondary phase at least partially distributed in the primary phase which is amorphous phase is not specifically shown in the drawings. Although the secondary phase does not form a regular shape, the secondary phase may be dispersed in the primary phase in the form of fine particles. In this case, the secondary phase, which has precipitated from the primary phase, may be regarded as particles. Then, the size of the secondary phase may be expressed as the particle diameter of the particles of the secondary phase, and the average of major and minor lengths or the diameter of the particles of the secondary phase observed in cross-sections may be regarded as the particle diameter of the secondary phase.

The particle diameter of the secondary phase distributed in the primary phase may be 5 μm or less, and preferably 1 μm to 3 μm. When the particle diameter of the secondary phase is less than the range mentioned above, the effect of strengthening mechanical properties may not be sufficient.

That is, the ceramic compound precipitates from the primary phase and finely and evenly disperse in the matrix of the alloy, which is the primary phase, and since the primary phase (matrix structure) and the secondary phase having the ceramic compound completely combine with each other along interfaces therebetween and are relatively uniform, the coupling strength between the primary phase and the secondary phase is high such that defects may not be observed along the interfaces.

Due to these characteristics of the composite material, the composite material 100 may entirely have high wear resistance, high corrosion resistance, and improved brittleness compared to a composite material formed by adding an external ceramic material to an amorphous alloy, thereby preventing formation of cracks in the composite material 100 and separation of the ceramic compound from the composite material 100.

Such complete coupling purity along the grain boundaries between the secondary phase and the primary phase may be inferred from the formation of the secondary phase and the origin of the ceramic compound of the secondary phase.

According to an embodiment of the present disclosure, the composite material 100 may be obtained through one process by cooling or processing a master alloy composition. That is, the composite material 100 having both the first and secondary phases may be obtained by cooling a master alloy composition having a single composition ratio to precipitate the secondary phase inside the primary phase, without a series of steps or complicated processes of mixing an alloy powder and a ceramic compound powder with each other or dispersing a ceramic powder in a molten alloy, and cooling or processing the mixture or the molten alloy.

The composite material is characterized in that the composite material may be obtained as follows: some metallic elements or nonmetallic elements for forming the ceramic compound are additionally added to an alloy composition which is designed to obtain an intended amorphous forming ability so as to fabricate a master alloy composition; and then the master alloy composition is cooled to physically and chemically precipitate the ceramic compound from the master alloy composition, thereby obtaining the composite material in which the secondary phase is dispersed in the primary phase.

Specifically, in the master alloy composition, the elements additionally (excessively) added to the alloy composition for obtaining a strong amorphous forming ability may include a metallic element and a nonmetallic element, preferably a nonmetallic element, and more preferably the nonmetallic element X of the ceramic compound.

The composite material, including the primary phase which is an alloy having a strong amorphous forming ability and the secondary phase which includes the crystalline ceramic compound dispersed in the primary phase, may be obtained at once by cooling the master alloy composition.

Through the above-described processes, the nonmetallic element stably forms the ceramic compound together with at least one metallic element included in the master alloy composition, and the ceramic compound may uniformly precipitate throughout the composite material 100 as a secondary phase. The method of precipitating the secondary phase including the ceramic compound in the composite material 100 corresponds to an in-situ method.

Inside the composite material 100 obtained by the in-situ method or along grain boundaries between the matrix having the primary phase and the ceramic compound having the secondary phase, impurities such as metal oxides and other compounds are hardly formed through chemical reaction between different materials, and thus merits such as improvements in the physical properties of the grain boundaries may be obtained.

The secondary phase is uniformly dispersed in the primary phase which is a metal matrix, and the degree of distribution of the secondary phase in the composite material 100 may be expressed by measuring the number of particles of the secondary phase per unit length (1 µm) on a cross-section of the composite material 100.

Specifically, the number of particles of the secondary phase dispersed in the primary phase may be calculated per unit length by observing the surface or a cross-section of the composite material 100 with an electron microscope, and when the calculated number is expressed as a distribution density (phase/µm), the distribution density of the secondary phase in the composite material 100 may be 0.2 to 1.2 per 1 µm, and preferably 0.4 to 1.0 per 1 µm.

If the distribution density of the secondary phase is less than the range mentioned above, the phase of the ceramic compound may not be uniform, and the mechanical properties of the composite material may be anisotropic. If the distribution density of the secondary phase is greater than the range mentioned above, corrosion resistance may decrease due to a decrease in the amorphous phase fraction.

Furthermore, according to another embodiment of the present disclosure, the composite material may further include a tertiary phase having a crystalline metal.

The tertiary phase may be optionally included in the composite material 100 of the present disclosure, and may include a crystalline metal dispersed in the primary phase which is an alloy matrix.

Like the secondary phase, the tertiary phase may include a crystalline metal precipitated from the master alloy composition having a single composition ratio, and preferably, the tertiary phase may have a crystal phase of the metallic element M included in the composition of the primary phase which is an amorphous alloy.

The tertiary phase may also be formed in the composite material by an in-situ method, and thus the first and tertiary phases may be homogeneously combined with each other, resulting in high coupling strength along grain boundaries or interfaces therebetween.

According to the present specification, the secondary phase and the tertiary phase are derived from the master alloy composition which is the same as the alloy included in the primary phase. Here, the expression "the second and tertiary phases are derived from the master alloy composition" means that elements forming the second and tertiary phases are not originated from the outside but are derived from elements included in the master alloy composition, and also means that the elements forming the second and tertiary phases are included in the master alloy composition when the master alloy composition is in a molten state before being cooled and are precipitated from the primary phase by cooling the master alloy composition.

That is, the expression may mean that when metallic and nonmetallic elements alloyed in the master alloy composition are separated from the master alloy composition and form a separate phase by chemical precipitation during the cooling of the master alloy composition, a ceramic compound obtained by the separate phase is regarded as being derived from the master alloy composition.

The composite material 100 may be used in various forms and by various methods, and the application field and purpose of the composite material 100 are not limited.

For example, according to an embodiment of the present disclosure, the composite material 100 may be provided in the form of a powder. After the alloy composition is prepared, the alloy composition may be cooled by an atomizing method or any other known method to form the composite material 100 as a powder.

In another example, the composite material 100 may be used to fabricate a coated body or a formed body.

A base material may be coated with powder of the composite material, and then a coating layer may be formed of the composite material having the first and secondary phases. In addition, a composite material-formed body including the first and secondary phases may be fabricated by forming powder of the composite material by a method such as a powder metallurgy method, an injection molding method, a casting method, or a 3D printing method.

In this case, any coating method may be used without limitations, and for example, a method such as a cold spray method or a high velocity oxygen fuel (HVOF) spray method may be used.

The coating layer and the formed body which are fabricated as described above may have high wear resistance and corrosion resistance owing to the primary phase including an amorphous phase, and may have improved brittleness and further improved wear resistance and corrosion resistance owing to the uniformly dispersed ceramic compound having the secondary phase.

MODE FOR INVENTION

Hereinafter, the present disclosure will be described in detail through examples.

EXAMPLES

1. Examples 1 to 7—Fabrication of Composite Materials

Composite materials were fabricated as follows. Alloy compositions were prepared using raw materials having the composition ratios shown in Table 1 below and were then supplied into an atomizer under a nitrogen gas atmosphere to atomize the alloy compositions in a molten state. Thereafter the molten alloy compositions were cooled to obtain composite materials in powder form.

TABLE 1

| Components | Example 1 | Example 2 | Example 3 | Example 4 | Example 5 | Example 6 | Example 7 |
|---|---|---|---|---|---|---|---|
| Fe (wt %) | 50.7 | 48.8 | 48.9 | 49.0 | 51.9 | 47.6 | 29.0 |
| Cr (wt %) | 15.6 | 18.3 | 10.8 | 13.5 | 15.3 | 44.5 | 30.9 |
| Al (wt %) | 0.3 | — | — | 1.5 | — | — | — |
| Mn (wt %) | 0.2 | — | — | 0.3 | — | — | — |
| Mo (wt %) | 26.4 | 20.8 | 28.3 | 23.3 | 27.1 | — | 4.0 |
| Ni (wt %) | — | — | 1.3 | — | — | — | 18.0 |
| Co (wt %) | — | — | 2.5 | — | — | — | 10.0 |
| Cu (wt %) | 0.2 | 0.2 | 0.8 | — | — | — | 2.5 |
| Ti (wt %) | — | 0.6 | 0.7 | 0.5 | — | — | — |
| Nb (wt %) | — | 1.0 | — | 1.5 | — | — | — |
| Ta (wt %) | — | 0.4 | — | 0.8 | — | — | — |
| W (wt %) | — | 0.3 | — | 1.6 | — | — | — |
| P (wt %) | 1.0 | 0.8 | — | 0.4 | — | — | — |
| B (wt %) | 1.1 | 5.3 | 3.2 | 4.2 | 1.2 | 5.9 | 4.0 |
| C (wt %) | 3.6 | 3.1 | 3.3 | 2.5 | 3.7 | — | — |
| Si (wt %) | 0.9 | 0.4 | 0.2 | 0.9 | 0.8 | 2.0 | 1.4 |
| Average particle diameter (μm) | 43 | 36 | 28 | 16 | 32 | 30 | 42 |

2. Examples 8 to 14—Fabrication of Coated Bodies

Coating layers having a thickness of 0.3 mm were formed of the composite materials of Examples 1 to 7 by a high velocity oxygen fuel (HVOF) spray method using an apparatus (Oerlikon Metco Diamond Jet series HVOF gas fuel spray system) with oxygen and propane gas as a fuel, and a spray distance of 30 cm. The apparatus and specific conditions used at that time are as follows, and a coated body of Example 12 is shown in FIG. 1.

DJ Gun HVOF

[Conditions] Gun type: Hybrid, Air cap: 2701, LPG Flow: 160 SCFH, LPG Pressure: 90 PSI, Oxygen flow: 550 SCFH, Oxygen Pressure: 150 PSI, Air flow: 900 SCFH, Air Pressure: 100 PSI, Nitrogen flow: 28 SCFH, Nitrogen Pressure: 150 PSI, Gun speed: 100 m/min, Gun pitch: 3.0 mm, Feeder rate: 45 g/min, Stand-off distance: 250 mm

EXPERIMENTAL EXAMPLES

1. Experimental Example 1 Observation of Microstructure of Composite Material

The microstructures of the composite material powder of Example 5 and the coated body of Example 12 were observed as shown in FIGS. 2 to 4. According to results of observation in FIGS. 3 and 4, the thickness of the coating layer was about 250 μm, and in the coated body formed by HVOF spraying, fine pores were observed along boundaries between particles of the composite material powder.

2. Experimental Example 2—Observation of Amorphous Phase and Crystal Phase

Specimens of Examples 5 and 12 were analyzed by XRD, EBSD, and EPMA to observe the presence of an amorphous phase and the degree of phase distribution in each of specimens.

FIGS. 5 and 6 are graphs showing results of the XRD analysis of Examples 5 and 12.

In FIG. 5, a peak of a ceramic compound having a composition $Fe_2B$ was detected as a secondary phase. In FIG. 6, the same $Fe_2B$ peak as in FIG. 5 was detected, and a halo peak was detected at an angle of 40 degrees to 45 degrees, such that the presence of a primary phase including an amorphous phase was expected.

FIGS. 7 and 8 show results of the EBSD analysis of Examples 5 and 12. In each phase map, a primary phase including an amorphous phase (metallic glass) shown in black was observed, and it was observed that secondary phases, such as $Fe_2B$ shown in blue and a very small amount of $Cr_2B$ shown in yellow, were dispersed in the primary phase. In addition, it was observed that a small amount of a tertiary phase, which was crystalline Fe(BCC) shown in red, was dispersed in the primary phase. The particle size of the tertiary phase was observed to be about 1 μm or less.

FIG. 9 shows results of the EPMA analysis of the coated body of Example 12. In FIG. 9, the distributions of Fe, Cr, Mo, and B are each shown, and each element is indicated with blue, green, yellow, and red as the content of the element increases. Although most of alloying elements are evenly distributed, it is observed that B and some metallic elements are present at similar positions in relatively large amounts, and thus it is expected that B and the metallic elements form a secondary phase.

3. Experimental Example 3—Observation of Distribution Density of Composite Materials In each of the composite materials of Examples 3 and 5 to 7, the distribution density of a secondary phase dispersed in a primary phase was measured based on 1 μm by using an electron microscope, and results thereof are shown in Table 2 below.

TABLE 2

| | Items | | | |
|---|---|---|---|---|
| | Example 3 | Example 5 | Example 6 | Example 7 |
| Distribution density of secondary phase (phase/μm) | 0.5 | 0.3 | 1.1 | 0.8 |

The features, structures, effects, etc. described by example in the embodiments above may be combined with each other or modified in other embodiments by those of ordinary skill in the art. Therefore, those combinations and modifications should be interpreted as being included within the scope of the present disclosure.

EXPLANATION OF SYMBOLS

100: COMPOSITE MATERIAL

The invention claimed is:

1. A composite material comprising:
a primary phase which is an alloy comprising a metallic element M and a nonmetallic element X and of which includes an amorphous phase in an amount of 50 vol % to 80 vol % based on the entire region of the primary phase; and
a secondary phase which is dispersed in the primary phase and comprises a ceramic compound, the ceramic compound comprising the metallic element M and the nonmetallic element X and represented by $M_aX_b$ where a and b are each greater than 0,
wherein the metallic element M comprises Fe, Cr, and at least one selected from the group consisting of Mo, Ni, Co, Cu, Ti, V, Nb, Ta, W, Mn and Al; and the nonmetallic element X comprises at least one selected from the group consisting of Si, B, C, N, S and P,
the secondary phase
has a distribution density of 0.2 phase/μm to 1.2 phase/μm; and
a tertiary phase which is dispersed in the primary phase and comprises a crystal phase of the metallic element M.

2. The composite material of claim 1, wherein the ceramic compound, in which the metallic element M and the nonmetallic element X are combined with each other, precipitates from the primary phase.

3. The composite material of claim 2, wherein the primary phase and the secondary phase are provided from a master alloy composition comprising the metallic element M and the nonmetallic element X, and the nonmetallic element X is included in a larger amount in the master alloy composition than in the primary phase.

4. The composite material of claim 1, wherein $M_aX_b$ comprises an Fe-based boride or Cr-based boride.

5. The composite material of claim 1, wherein the composite material is cooled into a powder by an atomizing method.

6. A composite material-coated body comprising a coating layer provided by coating a base material with the composite material of claim 5.

7. A composite material-formed body fabricated by forming the composite material of claim 5 by a powder metallurgy method, an injection molding method, a casting method, or a 3D printing method.

* * * * *